(12) United States Patent
Fletcher et al.

(10) Patent No.: US 9,865,171 B2
(45) Date of Patent: Jan. 9, 2018

(54) GEOGRAPHICAL POSITIONING IN TIME

(71) Applicant: Trimble Inc., Sunnyvale, CA (US)

(72) Inventors: Brian Fletcher, Suffolk (GB); Paul Inglis, Suffolk (GB); Robert Laithwaite, Suffolk (GB); John O'Reilly, Suffolk (GB); Evgeny Selensky, Suffolk (GB); Paul Sexton, Leicestershire (GB)

(73) Assignee: Trimble Inc., Sunnyvale, CA (US)

( * ) Notice: Subject to any disclaimer, the term of this patent is extended or adjusted under 35 U.S.C. 154(b) by 10 days.

(21) Appl. No.: 15/040,548

(22) Filed: Feb. 10, 2016

(65) Prior Publication Data

US 2016/0239024 A1 Aug. 18, 2016

(30) Foreign Application Priority Data

Feb. 12, 2015 (GB) .................................... 1502329

(51) Int. Cl.
*G08G 1/00* (2006.01)
*G06Q 10/00* (2012.01)
*G08G 1/0968* (2006.01)

(52) U.S. Cl.
CPC ............. *G08G 1/202* (2013.01); *G06Q 10/00* (2013.01); *G08G 1/096827* (2013.01); *G08G 1/096844* (2013.01)

(58) Field of Classification Search
CPC ............. G08G 1/202; G08G 1/096844; G08G 1/096827; G06Q 10/00

USPC ............................................................ 701/2
See application file for complete search history.

(56) References Cited

U.S. PATENT DOCUMENTS

| 2011/0144898 A1 | 6/2011 | Konig |
| 2015/0036363 A1 | 2/2015 | Fleskens et al. |

FOREIGN PATENT DOCUMENTS

| WO | 2006/007447 A2 | 1/2006 |
| WO | 2014/068314 A1 | 5/2014 |

*Primary Examiner* — Brian P Sweeney
(74) *Attorney, Agent, or Firm* — Kilpatrick Townsend & Stockton LLP

(57) ABSTRACT

A dispatch control system includes a data store with records of previously-attended geographical positions of a mobile unit indicating at least a duration of attendance. The dispatch control system is configured to calculate one or more stochastic characteristics for the durations of attendance representative of a variability of the durations of attendance at said past geographical positions, and generate data indicative of an order of attendance for the mobile unit based on travel and estimated durations of attendance. This data is re-ordered and volatility metrics for each set of modified data are determined. The set of volatility metrics is used to modify the data indicative of an order of attendance for the mobile unit. The dispatch control system is configured to transmit to the mobile unit data indicative of geographical positions corresponding to said modified generated data for use in generating routing instructions.

21 Claims, 8 Drawing Sheets

| Variable ID | Distribution Type | $\mu_{t_D}$ | $\sigma_{t_D}$ | N |
|---|---|---|---|---|
| 111111 | N | 14 | 10 | 300 |
| 222222 | L | 20 | 12 | 350 |
| 333333 | N | 30 | 15 | 400 |
| 444444 | N | 60 | 17 | 200 |
| 555555 | L | 16 | 5 | 100 |
| 666666 | N | 9 | 3 | 150 |
| 777777 | N | 17 | 12 | 124 | ent Application No. GB1502329.4, filed Feb. 12, 2015, the
GEOGRAPHICAL POSITIONING IN TIME

RELATED APPLICATIONS

This application claims priority to United Kingdom Patent Application No. GB1502329.4, filed Feb. 12, 2015, the entire contents of which are incorporated by reference herein for all purposes.

TECHNICAL FIELD

The present disclosure relates to controlling a geographical position of a mobile unit in time. The present disclosure may be used in a dispatch system.

BACKGROUND

In many modern technical infrastructures it is important to control the geographical position of one or more mobile units. For example, the mobile units may comprise autonomous or manually-controlled vehicles equipped with electronic positioning systems. The mobile units may be required to be present at a plurality of geographical positions over a given time period. For example, a fleet of autonomous vehicles may be required to perform number of actions at a number of different geographical positions. These positions may be tracked using the electronic positioning systems, for example based on measured geographic co-ordinates. Control systems may be arranged to monitor the movements of the mobile units to attempt to meet these requirements. For example, these control systems may be deterministic systems.

One problem faced by these control systems is uncertainty. The physical world is often unpredictable. For example, a mobile unit may be required to be present at a first geographical position at a first time and a second geographical position at a second time. The first geographical position may be a fixed distance from the second geographical position. A control system may thus calculate values for the first time and the second time based on a travel time for the fixed distance. However, due to uncertainty and unpredictability in the physical world, actual values for the times may differ from the calculated values. For example, times may vary based on, amongst others, one or more of: traffic, scheduled maintenance, weather, seasonal or periodic variations (e.g. based on start times and dates), physical conditions at each geographical position and complexity of equipment at each geographical position. Whereas most control systems are arranged to operate as linear deterministic systems, the reality of the physical world is often nonlinear and dynamic. Hence, it becomes difficult to control the geographical positions of the mobile units. This difficulty is then compound with further nonlinearities when controlling a plurality of mobile units wherein future geographical positions are based on a result at previous geographical positions.

WO2014/068314 A1 describes examples wherein a resource may be assigned a tour of tasks. Each of these tasks may have a geographical position. Assignment histories may be processed to determine estimated task durations. These estimated task durations may be used by a scheduling component to generate a schedule for a resource.

SUMMARY

According to an aspect of the present disclosure there is provided a dispatch control system, the dispatch control system being arranged to control a geographical position in time of one or more mobile units, the dispatch control system comprising:

a data store comprising records of first geographical positions, said first geographical positions being geographical positions previously attended by the or each mobile unit, said records indicating at least a duration of attendance at each previously attended geographical position;

a processing system, the processing system being arranged to cause at least one computing device to perform a scheduling process for at least one said mobile unit, the scheduling process comprising:

calculating one or more stochastic characteristics for the durations of attendance based on the records stored in the data store, the one or more measured stochastic characteristics being representative of a variability of the durations of attendance at said previously attended geographical positions;

generating data indicative of an order of attendance for said mobile unit at a plurality of second geographical positions in a predefined time period based on travel times between said second geographical positions and estimated durations of attendance at said second geographical positions, in which the estimated durations of attendance are based on the calculated one or more stochastic characteristics for the durations of attendance;

accessing said generated data indicative of the order of attendance for said mobile unit and calculating a plurality of values for a volatility metric corresponding to the order of attendance data, each value of the volatility metric being associated with a valid re-ordering of attendance of said mobile unit at one or more geographical positions in the plurality of second geographical positions; and modifying said generated data based on a comparison of the plurality of values for the volatility metric, wherein the dispatch control system is configured to transmit, to said mobile unit, data indicative of geographical positions corresponding to said modified generated data, the transmitted data being for use in generating routing instructions, which, when executed by a processor associated with the mobile unit, cause navigation of the mobile unit between physical locations associated with the geographical positions corresponding to said modified generated data.

According to a further aspect of the present disclosure there is provided a computer-implemented method for controlling time variability in a dispatch system, the dispatch system having one or more mobile units and events for said one or more mobile units to attend, an event having a start time, a variable duration and a geographical position, the method comprising:

for data indicative of a sequence of proposed future events, identifying a volatile event within the data that has a start time value before a start time value of a critical event, a volatile event having one or more measured stochastic characteristics for the variable duration of an event that matches a predefined stochastic profile, the predefined stochastic profile being indicative of a probability of a sampled value for the variable duration exceeding an estimated value, estimated values of duration being used for events within the data indicative of the sequence of proposed future events, a critical event having a start time within one or more predefined variability limits;

determining if the start time value of the volatile event is modifiable to a time value that is not before the start time value of the critical event, including:

identifying at least one time period for the volatile event within the time allotted for the sequence of proposed future events that results in a valid sequence of proposed future events, the at least one time period not being before the start time value of the critical event;

responsive to the start time value being modifiable, modifying at least the start time value of the volatile event within the data indicative of the sequence of proposed future events; and transmitting, to a first mobile unit of the one or more mobile units, data indicative of geographical positions corresponding to said volatile event and said critical event and indicative of said modified start time of the volatile event, the transmitted data being for use in generating routing instructions, which, when executed by a processor associated with the first mobile unit, cause navigation of the first mobile unit between physical locations associated with the geographical positions corresponding to said volatile event and said critical event.

According to a further aspect of the present disclosure there is provided a non-transitory computer-readable storage medium for managing time variability in a dispatch system, the dispatch system having one or more mobile units and tasks for said one or more mobile units to attend, a task having a start time, a variable duration and a geographical position, the non-transitory medium comprising a set of computer-readable storage instructions stored thereon which, when executed by at least one processor, cause the at least one processor to:

obtain data indicative of a given task sequence, the data indicative of the given task sequence having a variable indicative of a start time and a variable indicative of an end time, the data indicative of the given task sequence comprising data indicative of a plurality of tasks, wherein data indicative of a task in the plurality of tasks comprises a variable indicative of start time, a variable indicative of a geographical position and a variable indicative of an estimated duration;

identify pairs of tasks within the data indicative of the given task sequence that comprise data indicative of a volatile task with a start time value before a start time value of a critical task, wherein a volatile task is identified based on data indicative of a measured probability distribution for the estimated duration of the volatile task that is calculated from historical data, wherein a critical task has a start time within one or more predefined variability limits;

for a given pair of tasks comprising a given volatile task and a given critical task:

identify at least one time period wherein a start time value of the at least one time period is not before the start time value of the given critical task and the at least one time period has a duration greater than the estimated duration of the given volatile task;

determine whether an assignment that assigns a start time value for the given volatile task within the at least one time period is a valid assignment;

determine a volatility metric for the assignment;

in response to one or more valid assignments, select a task pair based on the determined volatility metrics for the pairs of tasks; and modify the data indicative of the given task sequence to assign a start time value for the volatile task in the task pair to a time value within the at least one time period, transmit, to a first mobile unit of the one or more mobile units, data indicative of geographical positions corresponding to said task sequence, the transmitted data being for use in generating routing instructions, which, when executed by a processor associated with the first mobile unit, cause navigation of the first mobile unit between physical locations associated with geographical positions of said task sequence corresponding to said volatile event and said critical event.

According to a further aspect of the present disclosure there is provided a non-transitory computer-readable storage medium comprising a set of computer-readable instructions stored thereon which, when executed by at least one processor, cause the at least one processor to:

receive, from a dispatch system, data indicative of a sequence of geographical positions, wherein:

the sequence of geographical positions corresponds to an order of attendance for a mobile unit at one or more tasks, the or each task having a start time, a duration of attendance and a geographical position;

the received data depends on one or stochastic characteristics for the durations of attendance, the stochastic characteristics being representative of a variability of the durations of attendance at geographical positions previously attended by the mobile units and/or by other mobile units associated with the dispatch system, and the received data depends on a volatility metric, each value of the volatility metric being associated with a valid re-ordering of attendance of the mobile unit at one or more geographical positions in the sequence of second geographical positions, and navigate between physical locations associated with the geographical positions.

Aspects of the present disclosure, for example as described above, facilitate navigation of mobile units to assigned tasks, taking into account uncertainties in travel times and attendance times corresponding to each task. For example, implementing a scheduling process that involves calculating values of a volatility metric for valid re-orderings of attendance allows selection of a re-ordering with low or minimal volatility. This typically implies low or minimal overall variability in travel times to tasks and/or attendance times at tasks. The present disclosure thus facilitates accurate and predictable control of attendance with minimised uncertainty, and utilizes the output of the novel scheduling process to control navigation of mobile units.

Further features and advantages of the present disclosure will become apparent from the following description, given by way of example only, which is made with reference to the accompanying drawings.

DETAILED DESCRIPTION

Certain examples described herein provide solutions that adapt to uncertainty. As such they are beneficial in controlling the position of mobile units in a real-world environment. Certain examples provide an improvement to a comparative solution of adding extra time periods to cope with uncertainty. For example, in this comparative solution, adding too little extra time to an order of attendance does not address the problem of uncertainty and adding too much extra time leaves mobile units under-utilized. Certain examples described herein process recorded data to calculate stochastic characteristics that are used, in certain cases in a feedback system, to accurately predict required attendance times at different geographical positions. This enables mobile units to attend locations at predicted and controlled times despite unpredicted and uncertain events. These stochastic characteristics may be calculated based on recorded data from electronic positioning systems, which addresses any human bias or manipulation.

Certain methods, as described herein, may be configurable, e.g. a frequency of operation and/or a time period over which stochastic characteristics are calculated may be configured. For example, the latter time period may be selected as the previous X time units (e.g. year or months) so as to maintain relevance. The former may be scheduled to update every X time units, e.g. to perform a feedback loop every day. The measured stochastic characteristics allow both mobile units and geographical positions to be categorised, e.g. by volatility or variability. Certain examples herein are also easily scalable and cope with increased complexity, e.g. as more mobile units need to be controlled and/or as more geographical positions are added to attend. As stochastic characteristics are used, certain examples described herein further operate with missing or incomplete data, e.g. any available record is used and, the more records that exist, the more accurate the control system becomes. For example, the system automatically adapts to a changing environment to provide optimised control of mobile units.

Certain examples described herein reduce the amount of processing required to cope with uncertainty. For example, uncertainty in orders or sequences of attendance at particular geographical positions can lead to extensive exception handling and re-ordering as mobile units fail to attend particular positions at predicted times. For a plurality of mobile units this may render a comparative system unusable. In contrast, certain examples described herein minimise an estimated volatility or variability in predicted times, which has been demonstrated to greatly reduce exception and error processing in operation.

Figure 1:
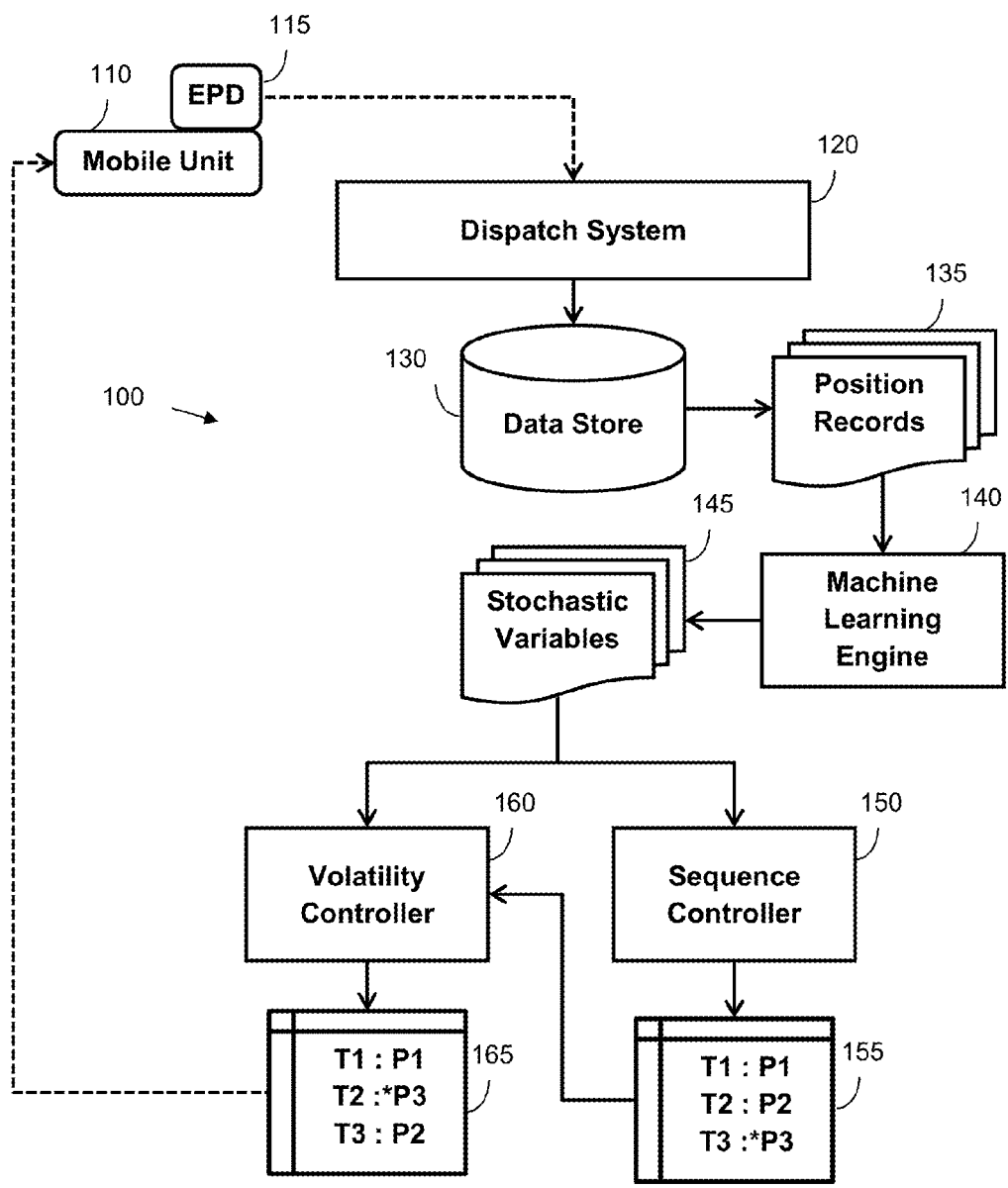
FIG. 1 is a schematic diagram showing a dispatch control system according to an example.

FIG. 1 shows an example dispatch control system 100 arranged to control a geographical position in time of one or more mobile units 110. Although only one mobile unit 110 is shown in FIG. 1, an implementation may have a plurality of mobile units, e.g. any number from tens to hundreds to thousands of mobile units. In FIG. 1, each mobile unit 110 is associated with an electronic positioning device 115. For example, the electronic positioning device 115 may form part of a global positioning system (GPS) or an alternative (e.g. Globalnaya Navigatsionnaya Sputnikovaya Sistema (GLONASS)). In one case, if the mobile unit 110 is a vehicle, the electronic positioning device may be physically secured to the vehicle. In another case, the electronic positioning device 115 may be removably coupled to the mobile unit 110. In FIG. 1, the electronic positioning device 115 reports location information to a dispatch system 120. For example, the electronic positioning device 115 may report a geographical coordinate to the dispatch system 120 at a predetermined frequency and/or when polled for a location. The geographical coordinate may comprise a latitude value and a longitude value. The location information may be reported directly or indirectly, e.g. may be explicitly transmitted to the dispatch system 120 or may be accessed by dispatch system 120, e.g. as a network service.

In FIG. 1, the dispatch system 120 is communicatively coupled to a data store 130. The dispatch system 120 is arranged to store position records 135 in the data store 130. The position records 135 comprise data indicating geographical positions previously attended by each mobile unit 110. In one case, a geographical position may be defined by a given geographical coordinate or one or more ranges of geographical coordinates. In this case, the dispatch system 120 may store position records 135 in data store 130 that indicate times a given mobile unit 110 has been located at the geographical position. In another case, a number of locations may be defined that each have a set geographical coordinate or one or more ranges of geographical coordinates. These locations may also be defined as geographical positions. For example, a building may be defined by latitude and longitude values, or ranges of these values. In this case, the dispatch system 120 may be arranged to process the data received from the electronic positioning device 115 of a given mobile unit 110 and determine times that the mobile unit 110 has been present at a given location. As such, in both cases, the position records 135 indicate at least a duration of attendance of a given mobile unit at each previously attended geographical position. For example, in a simple case, a position record 135 for a given mobile unit 110 may be of the form: {P1:$t_D$; P2:$t_D$; P1:$t_D$; P3:$t_D$} where Px is a position and $t_d$ is a length of time that the mobile unit spent at the location, e.g. in minutes or seconds, or of the form: {P1:$t_1$, $t_2$; P2: $t_1$, $t_2$; P1: $t_1$, $t_2$; P3: $t_1$, $t_2$} where $t_1$ is an arrival time and $t_2$ is a departure time. The position record 135 may have different forms depending on the implementation.

The dispatch control system 100 comprises a machine learning engine 140, a sequence controller 150 and a volatility controller 160. The machine learning engine 140 is arranged to periodically access the position records 135 in the data store 130. The machine learning component 140 is arranged to calculate one or more measured stochastic characteristics associated with duration of attendance. These one or more measured stochastic characteristics are stored as stochastic variables 145. The one or more measured stochastic characteristics are representative of a variability of the duration of attendance. For example, the one or more measured stochastic characteristics may comprise a determined probability distribution type and parameters or variables that define a particular embodiment of that type. For example, the one or more measured stochastic characteristics may comprise variable values that represent a mean value of duration and a measure of variation from said mean value. The one or more measured stochastic characteristics may be dependent on, e.g. a function of, one or more other variables. For example, values for stochastic variables 145 may be calculated for one or more of: different mobile units and different geographical positions.

The sequence controller 150 is arranged to use the stochastic variables 145 to generate data indicative of an order of attendance 155 for a given mobile unit at a plurality of geographical positions in a predefined future time period. This order of attendance is based on calculated travel times between the plurality geographical positions and estimated durations of attendance at said geographical positions. The estimated durations of attendance are calculated by the sequence controller 150 based on the stochastic variables 145, i.e. based on the one or more measured stochastic characteristics for the duration of attendance. For example, the stochastic variables 145 may comprise mean and standard deviation values for duration of attendance at a plurality of geographical positions. The machine learning component 140 may calculate these per known geographical position for all mobile units, predefined groups of mobile units or for individual mobile units. In one case, the sequence controller 150 is arranged to calculate estimated durations of attendance based on the mean value plus a factor calculated based on the measure of variation, e.g. a function of the standard deviation. For more complex probability distributions, the estimated durations of attendance may be based on values of cumulative probability, and/or a duration value representative of 80% of occurrences, and/or on one or more moments of the probability distribution.

FIG. 1 shows data indicative of an order of attendance at three geographical positions, P1, P2 and P3. The data generated by the sequence controller 150 of FIG. 1 associates a time with each geographical position. This may be an arrival time at each geographical position, which may be a start time for an estimated duration. For example, in FIG. 1 three times—T1, T2 and T3—are assigned to the respective three geographical positions—P1, P2 and P3. In the case that the times comprise arrival times, the sequence controller 150 is arranged to calculate the times to comply with estimated durations of attendance at each geographical position and the travel times between these positions.

Figure 2A:
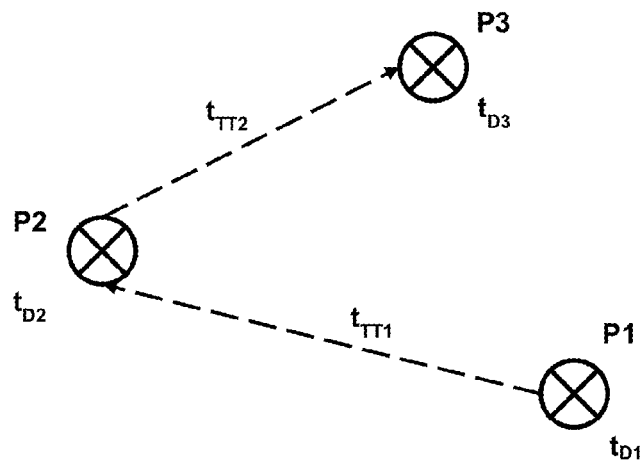
FIG. 2A is a schematic diagram showing three geographical positions according to an example.

FIG. 2A is a schematic diagram that demonstrates how the travel times and estimated durations may be used to determine the data indicative of an order of attendance 155 shown in FIG. 1. FIG. 2A shows, in a horizontal projection, the three geographical positions of the previous example—P1, P2 and P3. It thus shows the three geographical positions to be attended by a selected mobile unit, as shown in FIG. 1. For example, FIG. 2A may illustrate map data. In FIG. 2A each geographical position has an estimated duration of attendance $t_D$. In one case, following the examples described above, the estimated duration of attendance $t_D$ may be calculated based on a mean value plus a proportion of a measure of variation, e.g.:

$$t_D = \mu_D + \alpha * \sigma_D$$

where $\mu_D$ is the mean value, $\alpha$ is a configurable weighting parameter and $\sigma_D$ is the standard deviation. The mean value and the standard deviation are determined based on historical data stored in the position records 135. They may be determined in respect of one or more of the mobile unit and the geographical position, e.g. the mean value may be dependent on one or more of the mobile unit and the geographical position. In the example of FIG. 2, the estimated durations of attendance are based on at least the geographical position, i.e. P1 has an estimated duration of attendance of $t_{D1}$, P2 has an estimated duration of attendance of $t_{D2}$ and P3 has an estimated duration of attendance of $t_{D3}$. For example, the position records 135 for the selected mobile unit (or all mobile units) at each of the positions P1, P2 and P3 may be processed to determine the stochastic characteristics at each position for the selected mobile unit (or across all mobile units). FIG. 2A also shows calculated travel times between the three geographical positions, e.g. the mobile unit is required to attend to position P1, travel to position P2, attend to position P2, travel to position P3 and then attend to position P3. The travel time between positions P1 and P2 is thus calculated as $t_{TT1}$ and the travel time between positions P2 and P3 is thus calculated as $t_{TT2}$.

In certain cases, the travel time may be calculated based on a known distance between the positions and an average travel speed of the mobile unit. In certain cases the average travel speed (or the travel time itself) may be calculated based on historical data in data store 130. For example, stochastic characteristics associated with travel time may be determined from the data stored in data store 130. Data from the electronic positioning device 115 may be used to calculate travel time, e.g. based on received positions. In certain cases, multiple mobile units may use a common route, e.g. as recorded by the electronic positioning device 115, even if they have different positions to attend. In certain cases, external data indicative of routes may be analysed by machine learning engine 140. The stochastic characteristics that are determined may, in a similar manner to duration, provide a measure of uncertainty associated with travel times. For example, one or more probability distributions may be determined and one or more measures of variation may be calculated. This may then model engineering works on routes, seasonal traffic, route closures etc. Travel times may also be time dependent, e.g. the travel time between two positions P1 and P2 may vary with the time of day, week, month and/or year.

With reference to FIG. 2A, the sequence controller 150 may have a list of geographical positions a selected mobile unit is to attend. In the example of FIG. 1 the sequence controller 150 initially generates the data indicative of the order of attendance 155 based on the order {P1, P2, P3}. The sequence controller 150 may be arranged to generate data indicative of the order of attendance 155 for a given time period, e.g. from a defined start time to a defined end time or for a unit of time such as an hour or day. Starting with geographical position P1 (e.g., in this example, assuming the mobile unit starts at this position) and the estimated duration at P1 of $t_{D1}$, the sequence controller 150 calculates the start or arrival time at geographical position P2, T2, as at least $T1+t_{D1}+t_{TT1}$. Similarly, the sequence controller 150 calculates the start or arrival time at geographical position P2, T3, as at least $T2+t_{D2}+t_{TT2}$. Hence, the data indicative of the order of attendance 155 generated by the sequence controller 150 enables a mobile unit 110 to move to a series of locations over a given time period. For example, the data indicative of the order of attendance 155 may be downloaded or otherwise sent to the mobile unit 110 before the start of the time period for attendance, such that the data 155 is able to control the geographical position of the mobile unit 110 during the time period.

As at least the durations of attendance are calculated based on historical data, e.g. position records 135 in data store 130, with an additional factor representative of historical variation or volatility, mobile unit 110 has a higher likelihood of attending the positions without violating the requirements of data indicative of the order of attendance 155. For example, even if the actual time of attendance at position P1 or P2 is longer than expected, attendance at P3 at time T3 is still likely as a component of variation or volatility has been incorporated into the data indicative of the order of attendance 155. It should be noted that the example of FIG. 2A is a simplified example that is presented for ease of explaining the features of the systems and methods described herein. In actual implementations there may be any number of mobile units (e.g. 10 s to 1000 s) with any number of assigned positions to attend in a given time period (e.g. 10 s to 100 s). Moreover, two or more mobile units 110 may be required to attend a common position at a common time, e.g. to operate collaboratively. In this case, it is important that the times for attendance in the data indicative of the order of attendance 155 for one mobile unit 110 synchronise with the times for attendance in the data indicative of the order of attendance 155 for the other mobile units 110. Similarly, access to a geographical position may be time dependent and as such the times for attendance in the data indicative of the order of attendance 155 may be determined by the sequence controller 150 with knowledge of these time constraints. If an actual time of attendance is out of sync with the data 155 then access may not be available. Again, the factor representative of historical variation or volatility helps reduce the likelihood of this occurring, even with real-world unpredictability.

Returning to FIG. 1, the dispatch control system 100 comprises volatility controller 160. The volatility controller 160 is an adaptation to reduce the impact of uncertainty or unpredictability when controlling the location of one or more mobile units. The volatility controller 160 may be used independently of the estimated durations described above, or in combination with this feature. In the latter case the combination has a synergetic effect—the likelihood of failure of attendance is reduced in a complex non-linear manner. In FIG. 1, the volatility controller 160 is arranged to access said data indicative of the order of attendance 155 for a given mobile unit and process said data so as to, if determined possible, generate a modified set of data indicative of an order of attendance 165 that modifies the volatility of the order or sequence. This may be repeated, or performed collectively, for a plurality of mobile units. For example, in one case, the volatility controller 160 is arranged to optimise a volatility metric to generate data 165 with reduced volatility. The modified data indicative of an order of attendance 165 is then communicable to the mobile unit 110.

The adaptations of the volatility controller 160 results in a measurable reduction in recorded durations exceeding predicted durations and/or attendance failures by the mobile unit 110, e.g. as may subsequently be measured by an analysis of the position records 135 in data store 130. Indeed, in the example of FIG. 1, the dispatch control system 100 forms a closed loop feedback system; the reduced volatility in the predicted timing in data 165 affects the recorded data in position records 135, which in turn affects the stochastic characteristics represented by stochastic variables 145, which in turn modifies future generation of data 155 and 165 by the sequence controller 150 and the volatility controller 160. This is shown by the dashed lines in FIG. 1. Moreover, when a plurality of mobile units are controlled the effects of the feedback for each mobile unit interact to produce benefits that are not linearly predictable. For example, small improvements in the failure rate of attendance for each of a plurality of mobile units that have common positions to attend may lead to large improvements in the overall efficiency of the dispatch system. This is likely if cumulative probabilities based on consecutive attendance at a plurality of geographical positions are used.

Figure 2B:
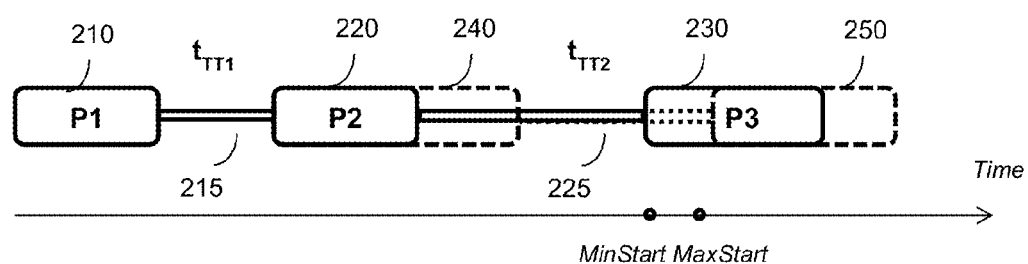
FIG. 2B is a schematic diagram showing durations of attendance at the three geographical positions of FIG. 1 according to an example.

The operation of the volatility controller 160 will now be described with reference to the examples of FIGS. 2B and 2C. FIG. 2B shows a representation of the data indicative of an order of attendance 155. A time axis is displayed horizontally wherein events to the right of the diagram are later in time than events to the left of the diagram. Predicted attendance at each of geographical positions P1, P2, and P3 is shown by blocks 210, 220 and 230, e.g. as represented by the data 155. The horizontal width of the blocks is representative of the time duration of attendance at a position. Travel times are shown by lines 215 and 225.

FIG. 2B further shows the result of unpredicted attendance at position P2. Dashed line 240 shows the effect of an extended presence at position P2, e.g. the result of the actual duration at position P2 being longer than the predicted duration $t_{D2}$. In this case, as travel time is fixed by the distance between the positions, attendance at position P3 is delayed. This is shown by dashed line 250. In FIG. 2B there is a window for attendance at position P3, shown as the time period between the earliest possible start time, MinStart, and the latest possible start time, MaxStart. If the start time of attendance at position P3 is past MaxStart then attendance at P3 may need to be aborted, i.e. attendance at P3 in line with data 155 is deemed a failure. For example, as discussed above, access to position P3 may be time dependent, e.g. may require a particular access gate to be open. Alternatively, an object at, or to be provided to, position P3 may be time dependent, e.g. amongst others, in an emergency may represent a time to structural failure, to chemical decomposition or to a loss of human life. As such, attendance by a mobile unit 110 within the time window is deemed 'critical', as represented by a '\*' in the data of FIG. 1. The dispatch system 120 may measure failure of attendance based on a comparison of data from the electronic positioning device 115 at a time between MinStart and MaxStart and data representative of the location of geographical position P3. If they do not match, e.g. within a predetermined tolerance range, a failure is indicated. Although only P2 is shown as overrunning, it should be noted that durations at multiple positions may overrun and influence the timing of a following critical event.

The volatility controller 160 operates to reduce the likelihood of the aforementioned failures. This is a measurable effect that may be demonstrated by comparing data in the data store 130 before and after the use of volatility controller 160, e.g. the number of recorded failures is reduced. The volatility controller 160 is arranged to calculate one or more differing orders of attendance and to generate data indicative of a re-ordered presence at one or more of the geographical positions of data 155. To achieve this the volatility controller 160 is arranged to determine whether a calculated re-order is valid, e.g. conforms to the same constraints that the sequence controller 150 applies to generate the data indicative of the order of attendance 155, and whether it results in a volatility metric that is representative of a lower measure of volatility. This may be performed by calculating a plurality of values for the volatility metric corresponding to valid re-orders of data 155 and selecting a lowest value. The re-order associated with the lowest value may then be used to generate the modified data indicative of an order of attendance 165. In one case, re-ordering may modify travel times between positions, e.g. may vary a time of day that a position is to be attended and thus change a measure of variability and/or average travel time. This may be reflected in the volatility metric.

Figure 2C:
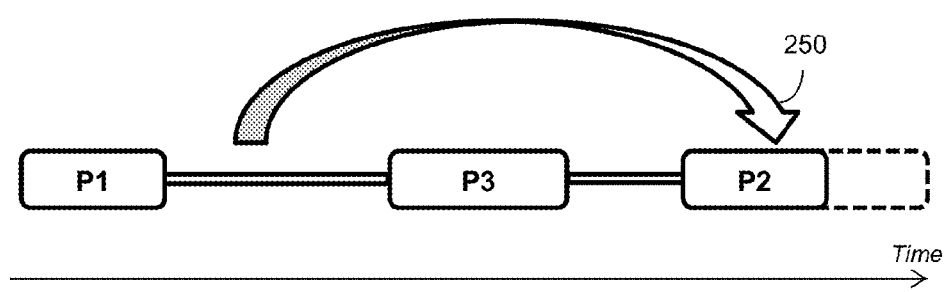
FIG. 2C is a schematic diagram showing durations of attendance at the three geographical positions of FIG. 1 after an order of attendance is modified according to an example.

This process is represented in FIG. 2C. In FIG. 2C it is determined that reordering attendance from {P1, P2, P3} to {P1, P3, P2} reduces the volatility of the planned sequence of attendance indicated in data 155. This is shown in FIG. 2C as a movement 250 of attendance at position P2 to a time following attendance at position P3.

In one case, the volatility controller 160 is arranged to calculate a volatility metric based on the one or more stochastic characteristics as represented by stochastic variables 145. For example, the volatility metric may be calculated based on the probability distributions representation of the duration of attendance at each of the geographical positions in the data 155, e.g. P1, P2 and P3. For example, the volatility metric may comprise a probability of duration for the set of positions, e.g. P1 to P3, exceeding a predefined value, such as 50% of a mean duration for the set or any over-run from an estimated total duration being longer than a predefined period, such as one hour. This may be the case if the durations of attendance for each position were not independent. In other cases, or additionally, the volatility metric may be calculated as a probability of failure to attend one or more of the geographical positions, e.g. a probability to fail to attend at least the geographical position P3 within the designated time window. The probability of failure may be cumulative based on attendance at one or more previous positions, e.g. a probability of overrun of duration at P1 and a probability of overrun of duration at P2 may both contribute to the probability of failure to attend position P3.

In certain cases, the volatility metric may comprise a result of a compound function or may comprise a variable within such a function. In one case, a compound function may be used to perform a multi-criteria optimisation, wherein the volatility metric forms one of the variables of this function. In one case, a plurality of volatility levels may be defined. These may represent different levels of volatility, e.g. high, medium and low volatility. They may be defined based on the stochastic characteristics, e.g. each may relate to a probability of overrun by a predefined percentage of an average duration of attendance and/or a particular probability of failure to attend a particular position. Average duration of attendance may also be based on, in certain cases, a type of activity being performed at the geographical position. A volatility metric may be classified as belonging to one of these levels. Each level may then be associated with a different set of constraints on data indicative of the order of attendance. In one case, an allowed increase in travel time may be based on the volatility level, e.g. if an order of attendance has a volatility metric classified as high volatility then an increase in travel time of a predefined amount (e.g. 20 minutes) may be allowed for the order of attendance. In this case, a trade-off between volatility and travel time is performed. This may be represented within the compound function, e.g. as a metric of the compound function is optimised, such is a defined trade-off between volatility and travel time implemented. Other factors that may be included in the compound function include, amongst others, timeliness of arrival at a position, fuel use and mobile unit utilization (e.g. time that the mobile unit is active rather than idle). For example, these may comprise other variables in any multi-criteria optimisation. The compound function may be configurable, e.g. in terms of predefined weightings of each variable, so as to optimise volatility within a larger defined variable space. A number of computer-implemented methods of controlling time variability in a dispatch system will now be described. These methods may be based on the operation of the dispatch control system described above. Alternatively, they may be implemented outside of said dispatch control system.

Figure 3:
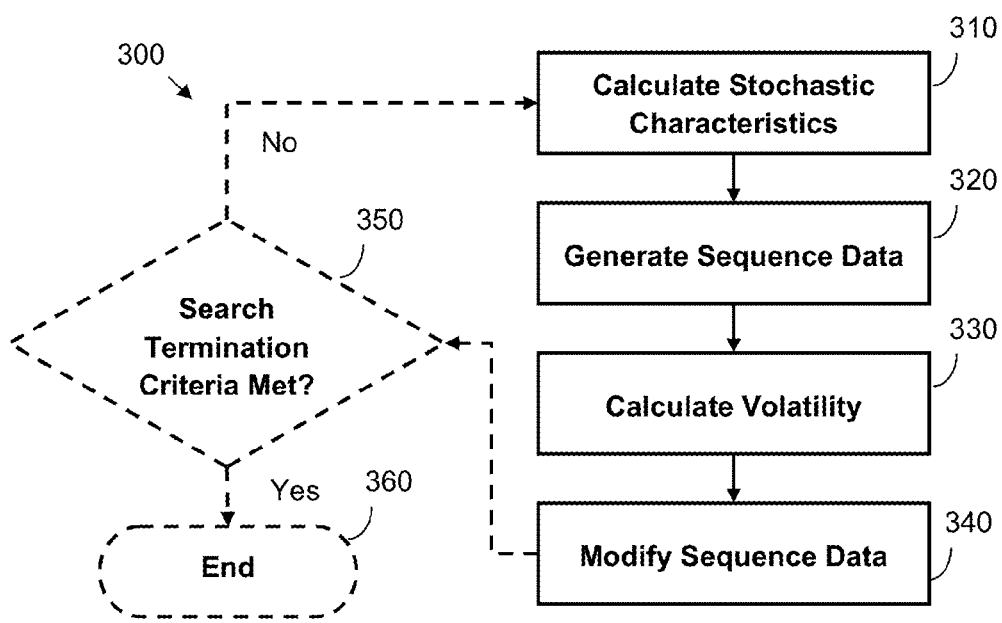
FIG. 3 is a flow diagram showing a process for controlling a geographical position, in time, of a mobile unit according to an example.

FIG. 3 shows a scheduling process 300 that is configured to control the geographical position of one or more mobile units. Before the scheduling process is performed a data store comprising records of first geographical positions is generated. For example, these records may comprise position records 135 as stored in the data store 130 of FIG. 1. The first geographical positions are geographical positions that have been previously attended by the or each mobile unit. These records indicate, either directly or indirectly, at least a duration of attendance at each previously attended geographical position. This data store may be accessed by the scheduling process. For example, the scheduling process may be implemented by a processing system in communication with the data store. The processing system may comprise one or more server computing devices.

In the example of FIG. 3, the scheduling process begins at block 310 wherein one or more stochastic characteristics are calculated. As described previously this may comprise determining probabilistic parameters for duration of attendance based on recorded data associated with the or each mobile unit. The one or more measured stochastic characteristics are representative of a variability of the durations of attendance at said past geographical positions. For example, they may comprise one or more moments of a probability distribution. For example, they may comprise a statistical variable such as one or more mean, median and/or modal variables, as well as a probability distribution type that is the "best fit" for the recorded data (e.g. that minimises an error), a variance measure, a measure of skew and/or a measure of kurtosis. This stage may also comprise any normalisation based on the recorded data. For example, sample size may be calculated from the records and used to normalise the data. The calculation used to determine the one or more stochastic characteristics may depend on the type of probability distribution that is selected for the historical data. In certain cases more than one probability distribution and/or probability distribution type may be selected, e.g. stochastic characteristics that are calculated per mobile unit may differ from stochastic characteristics that are calculated per geographic position, or stochastic characteristics that are non-categorised (e.g. use all the data) may differ from those that are based on categorised grouping (e.g. that are calculated for different groups).

At block 320, data indicative of an order of attendance for said mobile unit at a plurality of second geographical positions in a predefined time period is generated. These second geographical positions are positions for the mobile unit to attend at a series of future points in time, e.g. as compared to the first geographical positions that relate to positions that have been attended in the past. The data indicative of an order of attendance is generated based on travel times between said second geographical positions and estimated durations of attendance at said second geographical positions, in which the estimated durations of attendance are based on the calculated one or more stochastic characteristics for the durations of attendance. For example, an estimated duration for attendance at each geographical position may be based on at least a first and second moment of a probability distribution determined at block 310 or on a predefined probability measure, e.g. based on a value of duration determined for a predefined probability on a cumulative probability distribution determined based on block 310, such as a value of duration for which the probability is less or equal to a predefined value (e.g. 80% or 90%). Travel times may be retrieved, for example as a result of a query to a network service, where the query includes one or more of the second geographical positions. Travel times may also be determined based on one or more stochastic characteristics for those times, e.g. based on recorded data in a similar manner to the determinations for duration of attendance that are described herein.

At block 330, the data indicative of the order of attendance for said mobile unit that is generated at block 320 is accessed and a plurality of values for a volatility metric are calculated. Each value of the volatility metric is associated with a valid re-ordering of attendance of said mobile unit at one or more geographical positions in the plurality of second geographical positions. For example, as illustrated in FIG. 2C, the times of attendance at one or more geographical positions in the generated data may be modified, e.g. start time values may be swapped or changed, and a volatility metric may be calculated based on the re-order with the modified times. In one case, for example as described below, attendance at one or more geographical positions deemed "volatile" may be removed from a determined order of attendance and a re-ordering of attendance may comprise re-inserting attendance at one or more geographical positions deemed "volatile" at a start time following attendance at a geographical positions deemed "critical". The volatility metric may comprise a probability of failure of attending one or more of the geographical positions in the generated data, wherein failure is determined based on a likelihood of attending within a fixed time window. This probability of failure may be determined based on the stochastic characteristics determined at block 310. In certain cases, the volatility metric may be calculated using a compound function. For example, it may instead, or as well, comprise a probability of total attendance time at the re-ordered positions exceeding one or more constraints of the ordering at block 320, e.g. if the order of attendance has a fixed start and end time the volatility metric may comprise a probability of the total attendance time and the travel time exceeding the time period between the fixed start and end times. In a re-ordered sequence, one or more of the start times and the travel travels may vary.

At block 340, the data generated at block 320 is modified based on a comparison of the plurality of values for the volatility metric. For example, a value of the volatility metric representative of lower volatility or variability may be determined. For example, the plurality of values for the volatility metric may be compared and an order of attendance associated with the lowest value in the set may be selected. The attendance times and order associated with this value may then replace the attendance time and order generated at block 340.

In FIG. 3 a dashed line indicates that the process 300 may be repeated. For example, at least blocks 320 to 340 may be iterated until no further optimisation is possible. Block 310 may be performed as a pre-processing block or may be repeated for each iteration. Each iteration of the process may represent a local search wherein optimisation is performed until a set of search termination criteria associated with the local search are met as shown by block 350, e.g. based on a rate of change of the volatility metric an amount of processor time used, a number of iterations and/or a time period to perform the process. If the set of search termination criteria are met this may end the local search at block 360.

In the present example, the process 300 runs on the processing system without human intervention. The input to the processing system comprises data associated with one or more mobile units that is recorded over time. The output of the processing system comprises one or more orders of attendance, which may comprise a list of geographical positions and times of attendance, the order being for a given time period. In one case, the process 300 may be applied to a plurality of mobile units. In the same or another case, the process 300 may be applied for a plurality of time periods, e.g. if the time period is an hour, for a day; or if the time period is a day, for a week. The process 300 may form part of a continuous process, e.g. may be performed periodically and/or in real time. As such, as mobile units attend geographical positions based on the output of block 340, more data is recorded, which is then used to calculate and possibly modify the stochastic characteristics at block 310. The automated system thus "learns" and "adapts" over time. The process 300 is further different from a comparative manual system. For example, systems using cards, punched tags or plastic icons that manually log times and availability do not determine stochastic characteristics; indeed, often data is not recorded in a useable form. Moreover, tests demonstrate that the outcome and rates of failure of manual ordering differs significantly from the described process 300. For example, human bias often increases the rate of failure and these comparative methods do not consider the variability of attendance.

In one case, in the method 300, local modifications to sequence data may be made. This local modification may comprise generating a modified set of sequence data with different timings. Each modified set of sequence data meets any constraints applied when generating the sequence data at block 320. A local non-systematic search technique may be applied to analyse modified data to determine sequence data that meets these constraints and that minimises a compound function that comprises a volatility metric. In certain cases, a global search process may alternatively be used, or a hybrid approach that combines both systematic and non-systematic search techniques over a defined variable space.

Figure 4:
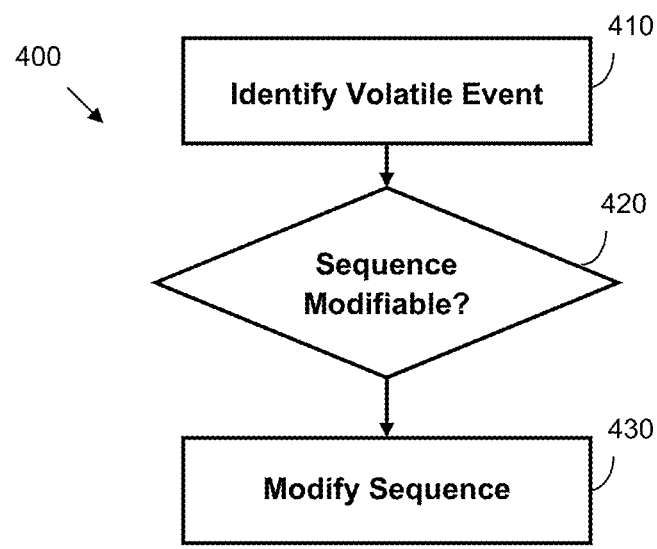
FIG. 4 is a flow diagram showing a computer-implemented method for controlling time variability in a dispatch system according to an example.

FIG. 4 shows a computer-implemented method 400 for controlling time variability in a dispatch system according to an example. In certain cases, the method 400 may implement blocks 330 and 340 of FIG. 3. In certain cases, the method 400 may be performed when implementing the dispatch control system 100 of FIG. 1. As with the previous examples, the dispatch system has one or more mobile units. For example, these may comprise one or more manually-operated and/or autonomous vehicles or moveable devices. In the example of FIG. 4, a set of geographical positions is associated with a set of events. An event, as used herein, is representative of attendance at a geographical position. An event has a start time and a variable duration, e.g. from recorded data it is determined that duration of an event associated with attendance at a geographical position is a random variable, i.e. has an associated stochastic/probabilistic profile. The start time may comprise arrival at the geographical position, e.g. in recorded data comprise a timestamp associated with presence at a defined location. An event may comprise, amongst others, applying one or more functions of the mobile unit (e.g. supplying water or foam, scanning using one or more sensors), a repair operation (e.g. either to or by the mobile unit, wherein equipment for repair may be located at a geographical position), delivery or collection of one or more items or objects (e.g. replenishing solid and/or liquid supplies, collecting waste, disposing of waste, ferrying livestock or human beings), applying emergency assistance, determining a status at the geographical position (e.g. of equipment and/or the ambient environment using equipment of the mobile unit) and charging or refueling (e.g. at electric charge points—either for or by the mobile).

Turning to FIG. 4, the computer-implemented method begins by accessing data indicative of a sequence of proposed future events. For example, this may comprise data similar to data 155 in FIG. 1. The data is electronically stored and may comprise one or more database records, flat-files, network-accessible data sources and/or contents of local or remote memory. In this data, at least one volatile event in the data is identified at block 410. A volatile event relates to attendance at a geographical position where one or more measured stochastic characteristics for the variable duration of that attendance matches a predefined stochastic profile. The predefined stochastic profile is indicative of a probability of a sampled value for the variable duration exceeding an estimated value. For example, an event may have an estimated duration $t_D$ equal to a mean value and a variance factor, this value and factor being calculated from historical data. An event may be volatile if the variance is greater than a predefined value (e.g. a standard deviation value being greater than 20 minutes). Alternatively, an event may be classed as "volatile" based on a corresponding cumulative probability distribution, e.g. based on the duration value for 90% of cases (e.g. 10% are estimated to exceed a time of X minutes). A determination may be performed by accessing calculated stochastic characteristics as described above.

At block 410, after a volatile event in the data is identified, a determination is made as to whether, within the data, the volatile event has a start time value before a start time value of a "critical" event. In this case, a critical event has a start time within one or more predefined variability limits. For example, attendance at a particular geographical position may always be deemed a critical event, or events may be indicated as critical in the data. The one or more predefined variability limits may comprise a range of possible start times for the critical event. In certain cases, this range may have one value, e.g. the critical event may have a fixed start time. The one or more predefined variability limits may comprise a window as described with reference to FIG. 2B. In certain cases more than one volatile event may be identified if the volatility of more than one event leads to a likelihood of critical event failure.

At block 420 it is determined whether the start time value of the volatile event is modifiable to a time value that is not before the start time value of the critical event. This may comprise identifying at least one time period for the volatile event within the time allotted for the sequence of proposed future events that results in a valid sequence of proposed future events, wherein the at least one time period is not before the start time value of the critical event. In one case, this may comprise removing the volatile event from the sequence of proposed future events and performing a local search of times following the critical event for re-insertion. This may comprise calculating the start time and the estimated duration of the critical event, which may be modified following removal of the volatile event, and starting a search for time periods in the data indicative of the sequence of proposed future events following this calculated time.

For example, the data indicative of a sequence of proposed future events may comprise data in relation to four events: A>B>C>D. In this case, "A" may be a volatile event and "B" may be a critical event. This may be determined by measuring a probability of failing to attend "B" given the stochastic characteristics of "A" and taking into account any time between the end of event "A" and the beginning of event "B". In this example, "A" is removed from the data leaving: B>C>D. A function may then retrieve available time slots after the critical event "B", e.g. {1,2} if event "B" is in time slot 0. Event "A" may then be inserted at each of the retrieved time slots, e.g. at time slot 1 and time slot 2. For each insertion a check is made if the data indicative of a sequence of proposed future events is still valid, e.g. meets any problem specific constraints for the sequence (such as resource availability, resource capacity, time windows on events, technological requirements on the sequence of events, etc.). Other checks may also include that a probability of failing to attend event "B" has reduced or been mitigated and a maximum volatility of the sequence has not increased, e.g. it may be avoiding a failure to attend event "B" increases the probability of failing to attend events "C" or "D".

In one alternative case, block 420 may comprise exchanging, in the electronic data, the times of events in the sequence. For example, the start times of the volatile and critical events may be exchanged in the data.

At block 430, responsive to a time period being available to re-order the volatile event, the start time value of the volatile event within the data indicative of the sequence of proposed future events is modified such that it is positioned after the critical event. A check may then be made to determine if the constraints of the sequence of future events is met; for example, at least that the travel times and the estimated durations are still within the time period for the sequence and do not cause any critical events to exceed their predefined variability limits. Block 430 may also comprise determining new start and/or travel times for rearranged events in the future sequence. A sequence may be determined as "valid", where constraints are met. Where a plurality of time periods are available, this process may be repeated for each sequence of proposed future events, e.g. to determine a plurality of "valid" sequences of proposed future events.

A volatility metric may be determined for each valid sequence of proposed future events, said valid sequence comprising the volatile event having a start time after the critical event. This volatility metric may be determined as described above. A particular valid sequence may then be selected based on the values of the volatility metrics. Even if only one time period is located, a volatility metric may still be calculated and compared to a predefined threshold, wherein in response to the volatility metric being below the predefined threshold the start time value of the volatile event is modified within the data indicative of the sequence of proposed future events. For example, the data may only be modified if there is a predefined reduction in volatility.

In certain cases, determining a volatility metric may form part of an optimisation process. For example, a compound function may be defined wherein the volatility metric is co-optimised with other optimisation variables. For example, travel time and/or timeliness of arrival may be co-optimised, e.g. a result of the compound function for a modified sequence that reduces a volatility metric but increases travel time may be compared with a result of the compound function for a modified sequence that reduces a volatility metric by a lesser amount but does not increase travel time. Depending on the weightings in the compound function, the latter modified sequence may result in a compound metric that is "better" (e.g. lower) than the former modified sequence.

In one case, the data indicative of a sequence of proposed future events comprises a sequence of proposed future events for each of a plurality of mobile units. In this case, identifying a volatile event within the data comprises identifying a volatile event within a sequence of proposed future events for a first mobile unit. Identifying at least one time period for the volatile event then comprises, for the first mobile unit, identifying at least one time period in a sequence of events for a second mobile unit that is not before a start time value of a critical event. If such a time period exists data indicative of a sequence of proposed future events for both the first and second mobile units is modified, such that the second mobile unit attends the event in place of the first mobile unit. By effectively exchanging the attendance of geographical positions between mobile units in a plurality of mobile units, the likelihood that critical events are not attended between the one or more predefined variability limits may be markedly reduced across the domain of the dispatch system.

As described above, a number of related calculations may be used to determine whether an event is "volatile". In one case, a "volatile" event may be determined based on a time difference in the sequence of proposed future events. For example, this difference may be based on an estimated duration of the identified event and the start time value of the critical event plus the maximum allowable delay, e.g. may represent an overrun of an event. In this case, a determination concerning whether the identified event is a volatile event may be made based on whether a likelihood of the time difference being less than zero exceeds a predefined threshold, e.g., in relation to FIG. 2B, whether an overrun of attendance at P2 is likely to move the critical event (P3) past MaxStart. In this case, the likelihood of the time difference is based on the one or more measured stochastic characteristics for the identified event, e.g. the threshold may be representative of a 10% or 20% probability of overrun. In certain cases, an event may be defined as "volatile" based on historical data and unassigned time in a sequence of events. For example, a "volatile" event may be any event whose average duration plus one standard deviation jeopardises attendance at a following critical event. In this case, events that have a high probability of overrun, yet that do not affect critical event may not be classified as "volatile". For example, assuming a normal distribution of durations, "volatile" may be set based on historical data if a given probability of failing a critical event is above a defined threshold and if a preceding task takes a time equal to an average duration+N standard deviations (where N is a configurable variable).

A number of computer programs for managing time variability in a dispatch system will now be described with reference to FIG. 5 and a number of pseudo-code examples. These may be used independently or in combination with any of the previously described examples.

Figures 5, 6A:
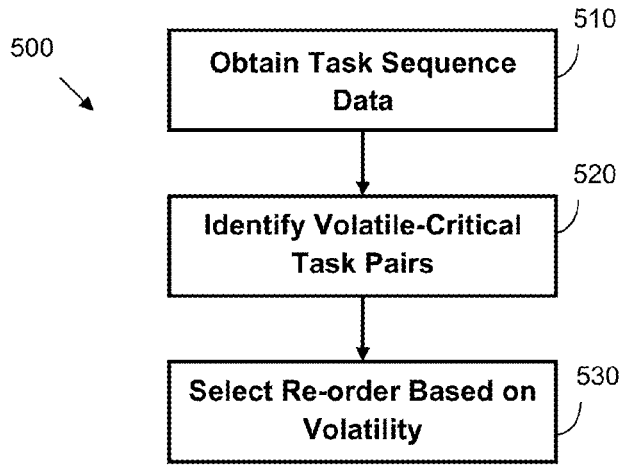
FIG. 5 is a flow diagram showing a computer program for managing time variability in a dispatch system according to an example.
FIG. 6A is a schematic diagram showing an example set of stochastic characteristics.

FIG. 5 shows steps performed by a computer program 500 according to an example. The computer program may be used in a dispatch system having one or more mobile units, e.g. as illustrated schematically in FIG. 1. In the dispatch system the one or more mobile units are required to attend one or more geographical positions. At each position they perform a task. A task is similar to an event and may comprise, amongst others, applying one or more functions of the mobile unit, as well as the other actions described above. A task has a start time, wherein attendance at a particular geographical position is required. Each task has a variable duration that requires the mobile unit to be present, for at least a portion of the duration, at the particular geographical position. The computer program comprises computer program code arranged to instruct one or more processors, e.g. of one or more server computing devices, to perform the blocks described below.

At block 510, data indicative of a given task sequence is obtained. For example, this may comprise data similar to data 155 in FIG. 1. The data may comprise an electronic data structure indexed by time values, e.g. an array, dictionary or set of comma separated values. In this case, each item in the data structure may be associated with a geographical position, e.g. directly or by reference. The geographical position may comprise a location as defined by a set of one or more geographical coordinates or one or more ranges of geographical coordinates. In the present example, the data indicative of the given task sequence has a variable indicative of a start time and a variable indicative of an end time. For example, this may be a date and/or time (e.g. 10:00 and 22:00 or 20/11/20—10:00 and 20/11/20—22:00). The data indicative of the given task sequence comprises data indicative of a plurality of tasks, wherein the plurality of tasks are associated with one or more geographical positions. In this example, data indicative of a task in the plurality of tasks comprises a variable indicative of start time, a variable indicative of a geographical position and a variable indicative of an estimated duration.

At block 520, one or more pairs of tasks are identified within the data indicative of the given task sequence. The or each pair of tasks comprise data indicative of a volatile task with a start time value before a start time value of a critical task. For example, with reference to the example of FIGS. 2A to 2C, if attendance at positions P1 and P2 is deemed to be "volatile" and attendance at position P3 is deemed "critical", then two pairs of tasks may be separately considered {P1, P3} and {P2, P3}. The function may be configured in certain cases to return task based on a particular probability range or level. A volatile task is identified based on data indicative of a measured probability distribution for the estimated duration of the volatile task. A critical task has a start time within one or more predefined variability limits. In one case, a time value may be calculated that is representative of a duration for a task that would result in a subsequent task exceeding a latest start time. For example, if an actual task duration is equal to 130 minutes, rather than an estimated value of 90 minutes, this may result in a subsequent critical task exceeding a MaxStart time. In this example, a probability value indicative of a duration of 130 minutes may be calculated, e.g. from a cumulative probability distribution. If this probability value is greater than a threshold, e.g. 25% or 0.25, this may indicate a volatile event.

For a given pair of tasks comprising a given volatile task and a given critical task, the computer program of FIG. 5 identifies at least one time period wherein a start time value of the at least one time period is not before the start time value of the given critical task and the at least one time period has a duration greater than the estimated duration of the given volatile task. This may be achieved by retracting (i.e. removing) the volatile task from the data, regenerating the task sequence (i.e. propagating a result of removing the volatile task) and identifying insertions at times following the critical task in the regenerated task sequence. Next, a determination is made as to whether an assignment that assigns a start time value for the given volatile task within the at least one time period is a valid assignment. For example, a check may be made that other constraints on total time and travel time are not violated. If the assignment is valid, a volatility metric is determined for the assignment. The volatility metric may be calculated as described above. In one case, a resource cost function may be computed for each valid assignment, in addition to the volatility metric. The resource cost function may be calculated based on one or more parameters of each valid assignment. For example, it may comprise a compound function of travel time, fuel cost, mobile unit idleness etc. The volatility metric may indicate a likelihood of an increase in mean duration.

At block 530, in response to one or more valid assignments, e.g. one or more calculated volatility metrics, the computer program is configured to identify a task pair based on the volatility metrics for the pairs of tasks. For example, this may comprise an optimal volatility metric for the pairs of tasks or at least a volatility metric that reduces the predicted volatility or variability of the original data indicative of the task sequence. The data indicative of the given task sequence is then modified to effect the assignment based on the volatility metric determination. This is performed by assigning a start time value for the volatile task in the task pair to a time value within the at least one time period. This may affect the change from data 155 to data 165 in FIG. 1.

In certain examples, the volatility metric and the resource cost function for each valid assignment may be evaluated to generate a set of possible re-ordered sequences. In one case, a value of the volatility metric may be classified into ranges of mean duration increase, e.g. into ranges of: 0-5% mean duration increase, 5-10% mean duration increase, 10-15% mean duration increase and above 15% mean duration increase for example. Each range may have an associated allowable range of resource cost values. For example, a 5-10% mean duration increase may be allowed if travel time and/or fuel use are within predefined ranges. These predefined ranges may then vary depending on the range of mean duration increase. In certain examples, this determination may be implemented by evaluating a result of a compound function that comprises variables indicative of both the volatility metric and resource costs.

Pseudo-code for a series of functions that may be used in the computer program above in one variation will now be described. This is provided for example only, equivalent functionality may also be provided with a number of different functions. The calculations and comparisons used are also examples, in implementations these may be configured based on requirements. To perform block 510 the following function may be used:

```
void optimizeOrder(Set<Sequence> sequences)
1.   Set<Sequence> volatileSequences ←
     identifyVolatileSequences(Set<Sequence> sequences);
2.   Set<MobileUnit> variableMobileUnits ←
     identifyVariableMobileUnits(Set<MobileUnits> mobileUnits);
3.   FOREACH volatileSequence IN volatileSequences DO
4.       minimizeVariability(volatileSequence, variableMobileUnits)
5.   END
```

Line 1 identifies a number of volatile sequences. These are sequences where attendance at a particular geographical position is associated with a given probability of exceeding an estimated duration and these are ordered or scheduled to start before attendance at a critical geographical position, i.e. introducing a risk of failing to attend at the latter. In certain cases probability values may be cumulative, e.g. representative of attendance at more than one volatile geographical position prior to a critical position. At line 2 a set of mobile units are identified that have a variability measurement that exceeds a predefined value. This may be performed as discussed in the variation described later below. At lines 3 to 5 the function iterates over the volatile sequences from line 1, calling the function described below:

```
minimizeVariability(Sequence sequence, Set<MobileUnit> variableMobileUnits)
1.   Set<AttendancePair> AttendancePairs ← sequence.getVolatileAttendancePairs( )
2.   FOREACH AttendancePair IN AttendancePairs DO
3.       int initTravelTime ← sequence.getTravelTime( )
4.       double initMaxSequenceVolatility ← sequence.getMaxSequenceVolatility( )
5.       Position volatileAttendance ← AttendancePair.getVolatileAttendance( )
6.       Position criticalAttendance ← AttendancePair.getCriticalAttendance( )
7.       int initTime ← sequence.removeAttendance(volatileAttendance)
8.       double minMetric ← initMaxSequenceVolatility
9.       Sequence bestSequence ← null
10.      Set<int> sequenceTimes ←
         sequence.getTimesAfterAttendance(criticalAttendance)
11.      FOREACH sequenceTime IN sequenceTimes DO
12.          boolean valid ← isAssignmentValid(sequence, sequenceTime,
             AttendancePair, initTravelTime, initMaxSequenceVolatility,
             variableMobileUnits)
13.          IF (valid AND sequence.Metric( ) < minMetric)
14.          THEN
15.              minMetric <- sequence.Metric( )
16.              bestSequence ← sequence
17.          END
18.      END
19.  END
20.  IF bestSequence NOT null
21.  THEN
22.      sequence ← bestSequence
23.  ELSE
24.      sequence.insertAttendanceAtTime(volatileAttendance, initTime)
25.  END
```

This function may be used to perform block 520 in FIG. 5. First, the function identifies (line 1) all ordered pairs of attendance in a sequence that match the pattern {volatile position, critical position} and have a stochastic profile, based on recorded position data, that indicates a likelihood of duration exceeding a predefined value. For example, this may be performed as described above, e.g. pairs may be identified based on a data analysis of cumulative duration distributions and assessing the likelihood of failing to attend certain "critical" positions given start timings in a sequence. These pairs are treated as candidates for inverting the ordering of attendance to minimize the likelihood of sequence failure. For each such pair the function performs a number of operations in lines 2-18. In line 3 to 6 a number of variables are initialised: at line 3 the initial travel time of the sequence is stored; at line 4 a maximum volatility of the sequence is determined; at lines 5 and 6 the volatile geographical position and the critical geographical position are retrieved. The maximum volatility of the sequence may be used to check that a re-ordered sequence does not increase the volatility of the original sequence. At line 7 the function removes attendance at the volatile geographical position from the sequence and stores the initial time (e.g. order position). At line 8 a temporary variable for the minimum calculated volatility metric is initialised to the value calculated at line 4. At line 9 a variable to store the best or optimal sequence, e.g. the re-ordered sequence with the lowest volatility metric value, is initialised as null. At line 10 sequence times (e.g. order positions) after attendance at the critical geographical position are determined. Lines 11 to 18 then iteratively attempt to reinsert attendance at the volatile geographical position in the same sequence after attendance at the critical geographical position at each of the identified times from line 10, e.g. looks at a number of re-ordered sequences.

In more detail, line 12 calls a function, described in more detail below, that determines if a sequence with a reinserted attendance is valid. At lines 13 to 16 a re-ordered sequence is evaluated to see whether it is valid and whether the volatility metric for that sequence is less that the temporary variable for the minimum calculated volatility metric. In a first iteration this will be the volatility metric for the original sequence order. If the evaluation is positive, the current re-ordered sequence is set as the current best or optimum sequence. Lines 19 to 24 modify the order of the original sequence by setting the sequence to the best or optimal sequence from the iteration of previous lines 11 to 18. If no better sequence is found, the original sequence is restored at line 23 by re-inserting the volatile position into its original time in the sequence.

An example implementation of the function called at line 12 above is shown below:

At line 1 the total travel time for the sequence passed to the function is determined. This sequence is the original sequence with attendance at the volatile position removed. This is compared to the total travel time of the original sequence at line 2. At line 3 attendance at the volatile position is set to one of the sequence times from line 10 of the previous function. At line 4 a value of the volatility metric is determined for the re-ordered sequence. At line 5 a Boolean variable is set to true if: 1) the value of the volatility metric for the re-ordered sequence is less than the value of the volatility metric for the original sequence; 2) the travel time does not exceed a defined limit; and 3) the re-ordered sequence meets a number of ordering constraints. For example, in certain cases a re-ordered sequence may be accepted if it is: 1) valid with respect to a set of defined constraints; 2) within acceptable limits of an increase in resource cost; 3) able to lower a probability of failing to attend a geographical position deemed "critical"; and 4) acceptable in terms of lowering a volatility metric or measure for the complete re-ordered sequence of attendance.

The defined limits for travel time may be configurable and may be defined differently for different bands of volatility as described previously. Ordering constraints may comprise one or more of: temporal constraints on attendance, e.g. attendance at a particular geographical position may be required within a defined time window; characteristics of the mobile units, e.g. only certain mobile units may be able to attend particular geographical positions; access constraints, e.g. access to a particular geographical position may be limited during one or more defined time periods; time boundaries, e.g. such as start of day and end of day, or hours of daylight; technical constraints on an activity to be performed at a particular geographical position, e.g. laying of cable by a mobile unit may need to be performed before testing of a communication channel carried by the cable or concrete laid by a mobile unit may need to dry before tar is applied by another mobile unit or paint/glue applied by one mobile unit may need to dry before a further activity; and/or attendance may require two or more specific mobile units at a particular geographical position and/or co-ordinated attendance at a plurality of geographical positions by a plurality of mobile units. Other constraints and examples are possible, wherein constraints may be applied in any combination for each implementation.

In the present example, whether a re-ordered sequence is valid is determined differently for mobile units that have a designated "variable" or "volatile" stochastic profile. As

```
boolean isAssignmentValid(Sequence sequence,
                int Time,
                AttendancePair pair,
                int initTravelTime,
                double initMaxSequenceVolatility,
                Set<MobileUnits> variableMobileUnits)
1.      int newTravelTime ← sequence.getTravelTime( )
2.      int deltaTravelTime ← newTravelTime - initTravelTime
3.      sequence.insertAttendanceAtTime(pair.getVolatileAttendance, Time)
4.      double maxSequenceVolatility ← sequence.getMaxSequenceVolatility( )
        boolean isValid ← maxSequenceVolatility < initMaxSequenceVolatility AND
        deltaTravelTime ≤ sequence.getDeltaTravelLimit( ) AND sequence.isValid( )
6.      IF sequence.getMobileUnit( ) IN variableMobileUnits
7.      THEN
8.         isAssignmentValid ← isValid
9.      ELSE
10.        isAssignmentValid ← pair.getProbabilityOfFailure( ) <
        sequence.getVolatilityLimit( ) AND isValid
11.     END
``` described previously, a volatile stochastic profile may be representative of at least one or more of a probability of a duration exceeding a given limit and a probability of failure to attend. If a mobile unit is deemed variable or volatile, then whether the re-ordered sequence is valid is set based on the evaluation at line 5, e.g. this evaluation is enough. If a mobile unit is not in the group of variable mobile units, an additional evaluation is performed at line 10. Here a check is made as to whether the probability of a failure to attend the critical geographical position is within a predetermined limit; if it is and the evaluation at line 5 is positive then the re-ordered sequence is deemed valid. In certain cases this may be performed if there is a lack of historical data; for example lines 6 to 11l may be amended to perform a check for a certain quantity of data, e.g. a certain sample size, and to only calculate a probability of failure if sufficient data exists.

Figure 6B:
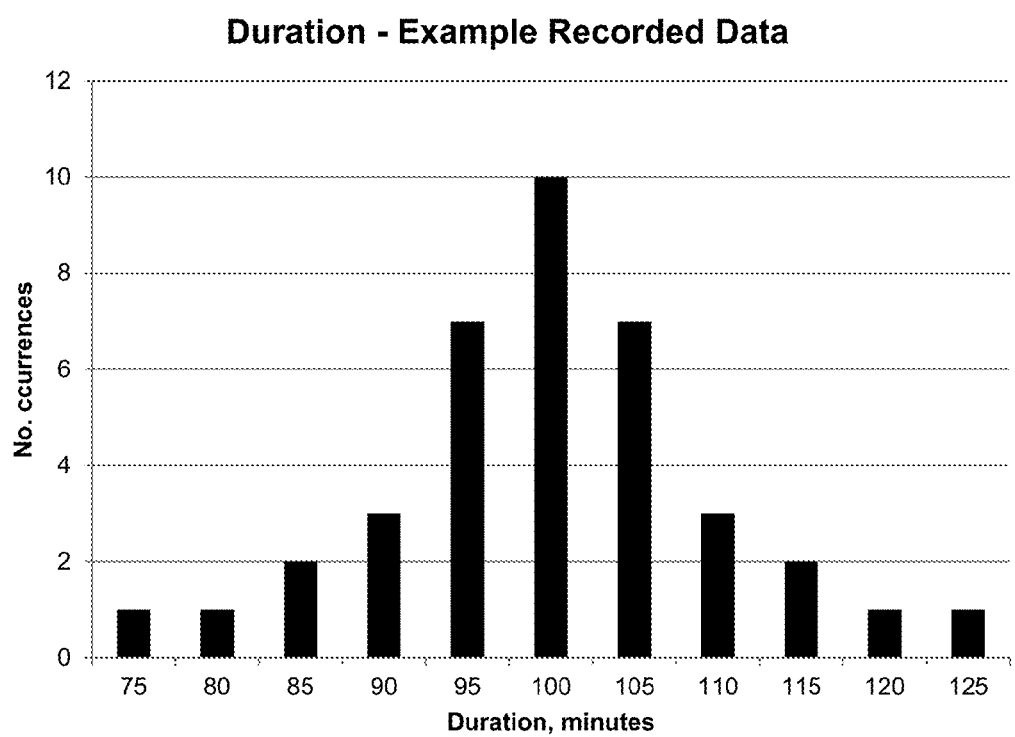
FIG. 6B is a schematic diagram showing recorded data that may be used to determine parameters for a probability distribution.

FIG. 6A shows a simplified example of electronically stored data 600 representative of one or more stochastic characteristics as described herein. For example, the data 600 may form at least a portion of the stochastic variables 145. In the example of FIG. 6A, the data 600 is indexed by a variable identifier 610. For example, this may comprise a mobile unit identifier or a location identifier. In more complex examples, data 600 may be indexed by multiple variables, e.g. there may be columns for both a mobile unit identifier and a location identifier. In one case the variable identifier 610 may be representative of a grouping, e.g. an association between groups of geographical positions such as any event or task performed at each geographical position and/or groupings based on geographical area. The groupings may be predetermined or calculated when the stochastic characteristics are required for calculations, e.g. using dynamic queries. The variable identifier 610 may in addition, or alternatively, be associated with, amongst others, a temporal grouping, e.g. times of day, week, month or year, recorded weather conditions, a work area defined for a particular mobile unit and recorded abilities and actions available to a particular mobile unit. In FIG. 6A, data 600 comprises a field indicating a type of probability distribution. In this case, the type is either a normal (i.e. Gaussian) distribution ('N') or a log-normal (i.e. Galton) distribution ('L'). Data 600 further comprises parameters for these distributions that are calculated from recorded attendance data from mobile units. In this simple example there are two parameters for both distributions: $\mu_{t_D}$—the mean 630 and $\sigma_{t_D}$—the standard deviation 640. These are determined per variable identifier 610. The data 600 also comprises the number of samples or data points 650 used to calculate the parameters. For example, 300 individual records associated with variable ID 111111 were processed to calculated parameters 630 and 640. The number of samples or data points 650 may be used to normalise the data 610 based on sample size and/or be compared to a threshold such that stochastic characteristics are only used for sample sizes beyond a predefined threshold. FIG. 6B shows an example of recorded data that may be used to derive the parameters shown in FIG. 6A.

In one variation of the above described examples, the one or more stochastic characteristics may comprise a parameter representative of a relationship between a particular mobile unit and a particular geographical position. For example, if the recorded data indicates that the particular mobile unit attends the particular geographical position repeatedly over a predetermined period of time following a first visit, this may be used to filter mobile units that are able to attend at the particular geographical position, e.g. to weight attendance for the particular mobile unit.

In another variation, a number of repeat visits to a particular geographical position may be used to generate a "competency" metric for a particular mobile unit. For example, a low number of repeat visits to a particular geographical position by a particular mobile unit may indicate that the success rate of an activity performed at the particular geographical position is high; on the other hand, a high number of repeat visits to the particular geographical position by the mobile unit may indicate that the success rate of an activity performed at the particular geographical position is low. The number of repeat visits may thus be used as a variable for assigning a mobile unit to attend a particular geographical position; for example, a mobile unit with a low number of repeat visits may be preferred over a mobile unit with a high number of repeat visits. A number of repeat visits may also be associated with an activity as opposed to the geographical position, e.g. repeat attendance at a particular geographical position after a given activity may be recorded against the activity. Activities may be assigned to groupings that are used to calculate repeat visits, e.g. all activities within a given group may be defined as a single activity type for repeat visits. Additionally, or alternatively, a similarity of geographical positions may be used to group positions to count repeat visits for the group. A competency metric based on a number of repeat visits as described may be used to indicate a volatility of a mobile unit, e.g. if attendance data is absent and/or in combination with the volatility measures described above. This may in turn be used when generating re-ordered schedules, e.g. attendance deemed critical may be assigned to mobile units with a higher competency metric. In one case, the competency metric may be used to compute the volatility metric as described above and as such be used to select locally optimal assignments with low volatility. A competency metric may be used such that attendance that is deemed critical is only assigned to mobile units that have a competency metric above a given threshold.

In certain cases, a competency metric may be set based on activities that are recorded as requiring further attention from a mobile unit. For example, despite attendance at a particular geographical position, an activity at that position may not be completed. This may occur if an activity at a particular geographical location is abandoned in order to attend a further geographical location according to a defined sequence of future events. Records of geographical positions (or activities) that require further attention may be used in a similar manner to repeat visits to set a competency metric. For example, if a particular mobile unit has a high number of positions (or activities) that require further attention a competency metric may be low (e.g. set as 1/number).

Figure 7:
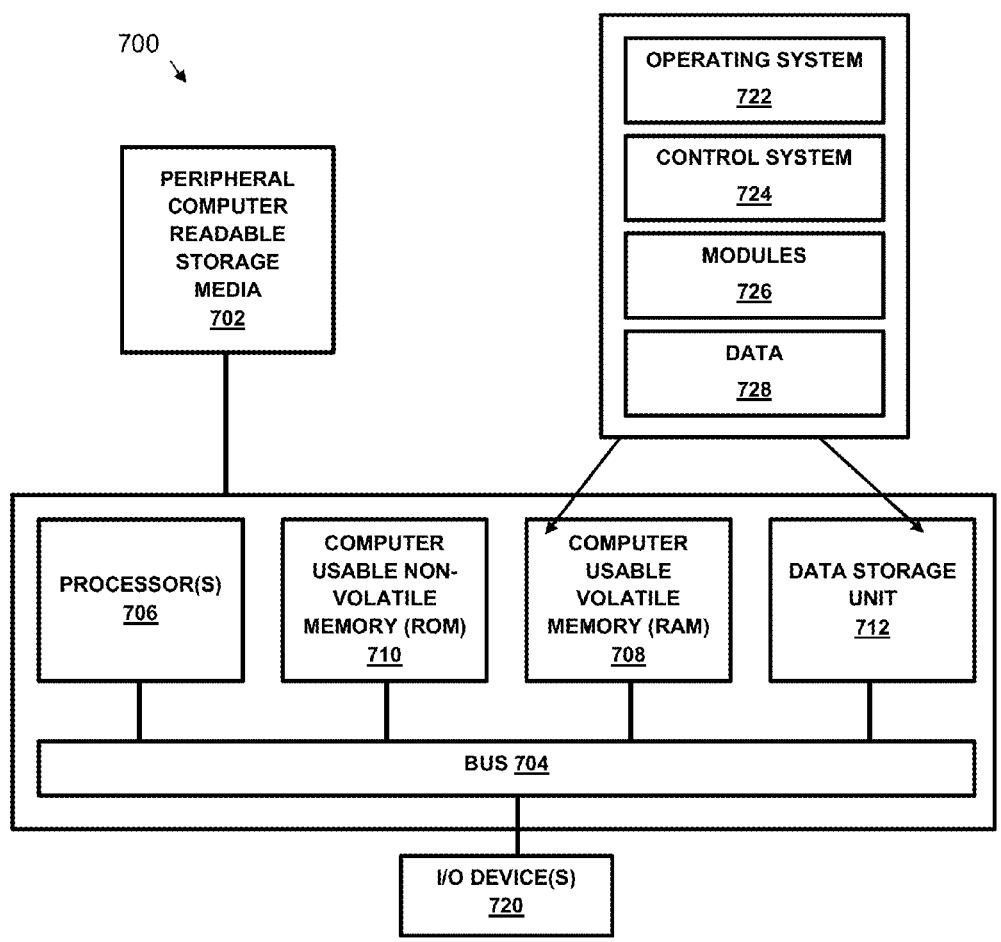
FIG. 7 is a schematic diagram showing a server computing device according to an example.

With reference now to FIG. 7, all or portions of some examples described herein are composed of computer-readable and computer-executable instructions that reside, for example, in computer-usable/computer-readable storage media of a computer system. That is, FIG. 7 illustrates one example of a type of server computing device (computer system 700) that can be used in accordance with or to implement various examples which are discussed herein. Computer system 700 of FIG. 7 is adapted to having peripheral tangible computer-readable storage media 702 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 700 of FIG. 7 includes an address/data bus 704 for communicating information, and one or more processors 706 coupled with bus 704 for processing information and instructions. Processors 706 may be any of various types of microprocessors. System 700 also includes data storage features such as a computer usable volatile memory 708, e.g., random access memory (RAM), coupled with bus 704 for storing information and instructions for processors 706. System 700 also includes computer usable non-volatile memory 710, e.g., read only memory (ROM), coupled with bus 704 for storing static information and instructions for processors 706. Also present in system 700 is a data storage unit 712 (e.g., a magnetic or optical disk and disk drive) coupled with bus 712 for storing information and instructions. In certain cases data storage unit 712 may be outside of system 700, e.g. part of a network storage system. System 700 also includes one or more input/output (I/O) devices coupled with bus 704 for communicating information and command selections to processors 706. These I/O devices may comprise at least a network interface. They may also comprise an interface for communicating with the mobile units, e.g. using radio and/or network protocols. The computer system of FIG. 7 is a headless server computing device—e.g. is configured to operate autonomously with access via the network interface.

Referring still to FIG. 7, various other components are depicted for system 700. Specifically, when present, an operating system 722, a control system 724, modules or libraries 726, and data 728 are shown as typically residing in one or some combination of computer usable volatile memory 708 (e.g., RAM), computer usable non-volatile memory 710 (e.g., ROM), and data storage unit 712. The control system 724 may comprise the dispatch control system described herein. The data 728 may comprise the position records described herein. The control system 724 may be implemented by way of computer program code stored in memory locations within RAM 708, computer-readable storage media within data storage unit 712, peripheral computer-readable storage media 702, and/or other tangible computer-readable storage media. When implemented on embedded systems the control system 724 may also comprise the operating system 722.

In embodiments, various methods may be used for controlling the motion of one or more mobile units. Such methods vary in their levels of detail. According to one example, a sequence of geographical positions is determined and communicated to a mobile unit 110. The unit 110 then makes route-planning decisions based solely on the sequence of geographical locations communicated to it. To provide a closer to optimal solution for street level routing, traffic or weather data may be taken into account at the point of scheduling or dispatch. Routing information generated at the time of scheduling or dispatch can be used in order to improve the quality of the executed schedule. The conceptual simplicity of this level of control is traded off by a potential discrepancy between what is planned and what actually takes place as the routing instructions derived from the schedule are executed by the mobile unit 110.

Figure 8A:
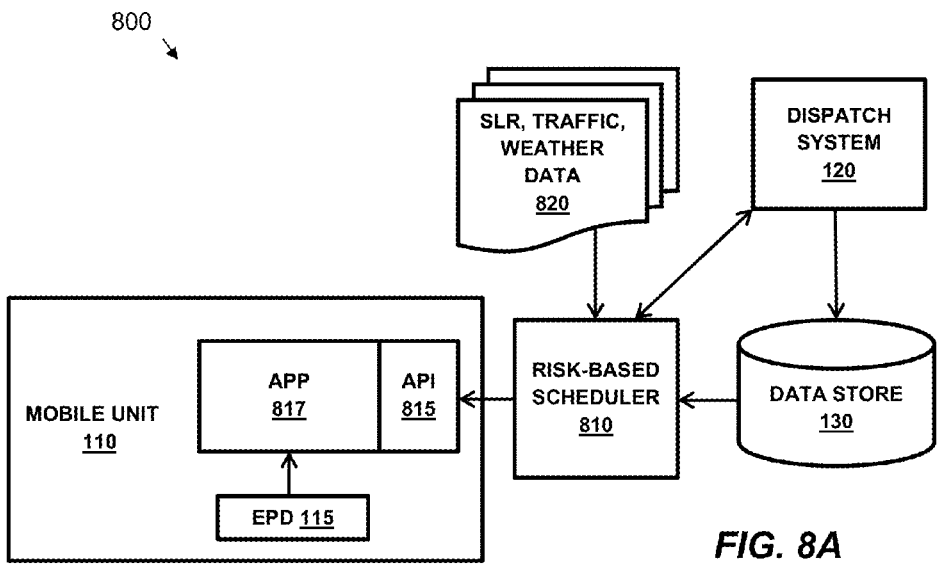
FIGS. 8A and 8B are schematic diagrams showing examples of data flow according to examples.

Such an embodiment is illustrated in FIG. 8A which shows schematically an example 800 of data flow for generating instructions for a mobile unit 110. A dispatch system 120 and data store 130 operate as described above, for example with reference to FIG. 1. A risk based scheduler 810, which comprises the dispatch control system 100 described above, assigns at least one task to the mobile unit 110 and produces a sequence of geographical locations corresponding to the at least one task, for example with minimised risk according the afore-described methodologies. When producing this sequence, the risk based scheduler 810 may take into account data including for example street level routing, traffic and/or weather data 820. This sequence is communicated to a routing application 817 associated with the mobile unit 110. The application 817 may receive sequence of geographic locations though an application programming interface (API). In one example, the application 817 may be implemented within a dedicated navigation unit. In other examples, the application 817 may be implemented within a mobile device such as a mobile telephone or tablet computer. As another example, the application 817 may be implemented within onboard software of the mobile unit 110.

Using the sequence of geographic locations, the application 817 produces a detailed street level route for the mobile unit. In this example the data 820 is taken into account at the point of scheduling, and consequently the planned route does not take into account real-time considerations such as changing weather or traffic congestion. In certain embodiments, the application 817 receives real-time positioning data from an electronic positioning device 115 and uses this data to track the position of the mobile unit 110 as it traverses the route.

According to a further aspect, finer more real-time control is achieved by delegating some aspects of route planning to the mobile unit 110. This enables the route planning to take into consideration real-time street level routing, traffic and weather information. This information may be received by the mobile unit 110 via external data sources such as notification services provided for example by the operator of the dispatch system 120, or by a third party provider. Such services may provide the real-time data by data transmission over a wireless telecommunications network, for example implementing the Universal Mobile Telecommunication System (UMTS) or Long Term Evolution (LTE) standards. In other examples, the data may be transmitted via other wireless transmission methods such as by Short Message Service (SMS) messages. This system also allows account to be taken of changes in task execution duration. This reduces discrepancy between the planned route and its real time execution and, consequently, the need for human operator involvement in managing exceptions.

Figure 8B:
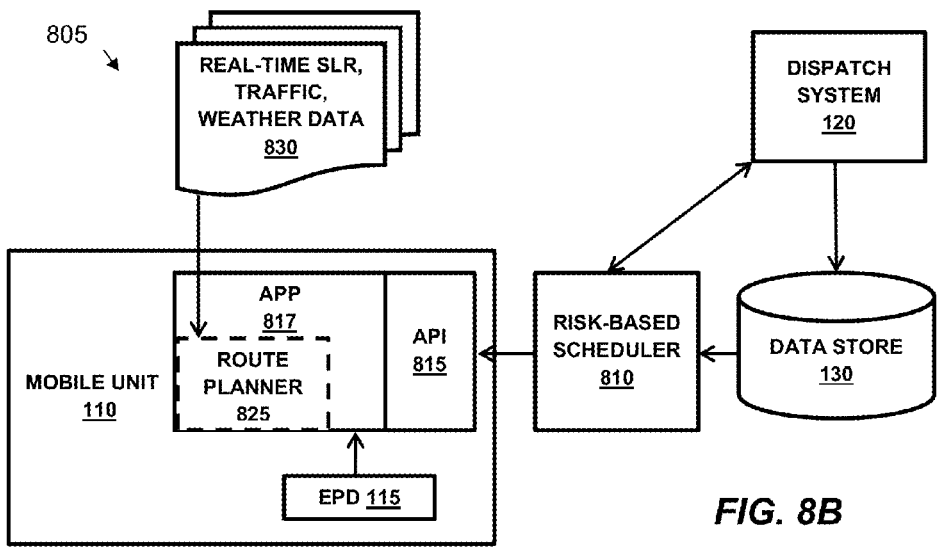

Such an embodiment is illustrated in FIG. 8B, which shows schematically an example 805 of data flow for generating instructions for a mobile unit 110. A dispatch system 120 is communicatively coupled with a data store 130 comprising data indicative of tasks to be completed. Data corresponding to these tasks, for example describing job locations and execution times, is transmitted to the risk-based scheduler 810. The risk-based scheduler 810 assigns at least one task to the mobile unit 110 and determines a sequence comprising the at least one task, for example taking into account estimated travel time. Data indicating the sequence is transmitted to the routing application 817 of the mobile unit 110. In other embodiments, the sequence comprising the at least one task may be determined by the routing application 817 of the mobile unit 110.

The application 817 may receive the data indicating the sequence through an API 815, similarly to the embodiment described above in relation to example 800. A detailed street-level route is then produced in a route planning module 825 of the application 817. In other embodiments, the route planning module 825 may be implemented within a separate application to the application 817. When producing this route, the route planning module 825 takes into account real-time data 830, for example including street level routing, traffic and/or weather information. The planned route may be updated based on updated data 830 as the route is traversed.

In embodiments as described above such as examples 800 and 805, data indicative of the detailed street-level route is provided to the mobile unit 110, which may for example be a vehicle. Various methods exist for providing this data. As one example, the data may be provided as visual or audible turn-by-turn instructions, or a highlighted route on a representation of a map, to be followed by a human operator.

In another example, the mobile unit 110 is operated in a fully automated mode wherein the street-level route is followed automatically. In such an example, the data provided to the mobile unit 110 comprises turn-by-turn instructions or other route data indicative of the route between the sequence of locations to be visited by the mobile unit 110, suitable for execution by the mobile unit 110. As such, the mobile unit 110 is configured either to receive route data transmitted from the dispatch system 120 via the application 817, or, where the application 817 implements a route planner 825, to receive route data transmitted from the application 817.

The mobile unit 110 is then configured to follow a route based on the route data. In an embodiment, a processor, for example an element of a telematics unit of the mobile unit 110, executes control software to autonomously control the mobile unit 110. The software takes as input route data as described above, as well as data from sensors that provide data describing parameters including, for example, the position and status of the mobile unit 110. For example, the sensors may comprise a camera or cameras for identifying objects in the vicinity of the mobile unit 110 such as other vehicles, as well as for monitoring position of the mobile unit 110 within a lane of a road. As another example, the sensors may comprise rangefinders such as laser rangefinders for identifying the distance of nearby objects to the mobile unit 110. The sensors may also provide information about the internal state of the mobile unit 110, for example including engine temperature, fuel or charge level and oil level. Sensor data is typically received by the software via an internal communication network within the mobile unit 110. This internal network may operate according to a specialised vehicle bus standard, such as Controller Area Network (CAN) or FlexRay.

The inputs described above allow the software to determine appropriate actions to navigate the mobile unit 110 to a geographical position identified in the route data. This typically comprises control of actuators associated with operation of the mobile unit 110. The actuators may operate, for example, the steering and throttle of the mobile unit 110.

The mobile unit may comprise an autonomous car such as a Google self-driving car, or other automated or robotic vehicle, for example a drone. The route may be executed completely automatically with no input from a human driver or operator. According to other aspects, a degree of human input is required. For example, a human operator may be required to approve the route at the outset and/or periodically during operation, for example after the route is updated based on real-time data 830.

Although at least some aspects of the examples described herein with reference to the drawings comprise computer processes performed in processing systems or processors, examples described herein also extend to computer programs, particularly computer programs on or in a carrier, adapted for putting the examples into practice. The program may be in the form of non-transitory source code, object code, a code intermediate source and object code such as in partially compiled form, or in any other non-transitory form suitable for use in the implementation of processes according to the examples described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The above examples are to be understood as illustrative, but non-limiting. Further examples are envisaged. Simplified and schematic examples have been provided for ease of explanation; however, implementations may be more complex. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present disclosure, which is defined in the accompanying claims.

The invention claimed is:

1. A dispatch control system for controlling geographical positions in time of one or more mobile units, each mobile unit comprising a vehicle, the dispatch control system comprising:

a data store comprising records of first geographical positions, said first geographical positions being geographical positions previously attended by the one or more mobile units, said records indicating at least a duration of attendance at each previously attended geographical position;

a processing system, the processing system configured to cause at least one computing device to perform a scheduling process for at least one said mobile unit, the scheduling process comprising:

calculating one or more stochastic characteristics for the durations of attendance based on the records stored in the data store, the one or more measured stochastic characteristics being representative of a variability of the durations of attendance at said previously attended geographical positions;

generating data indicative of an order of attendance for said mobile unit at a plurality of second geographical positions in a predefined time period based on travel times between said second geographical positions and estimated durations of attendance at said second geographical positions, wherein the estimated durations of attendance are based on the calculated one or more stochastic characteristics for the durations of attendance;

accessing said generated data indicative of the order of attendance for said mobile unit and calculating a plurality of values for a volatility metric corresponding to the order of attendance data, each value of the volatility metric being associated with a valid re-ordering of attendance of said mobile unit at one or more geographical positions in the plurality of second geographical positions; and modifying said generated data based on a comparison of the plurality of values for the volatility metric;

wherein the dispatch control system is configured to transmit to said mobile unit data indicative of geographical positions corresponding to said modified generated data, the transmitted data for use in generating routing instructions, which, when executed by a processor associated with the mobile unit, cause navigation of the mobile unit between physical locations associated with the geographical positions corresponding to said modified generated data.

2. The dispatch control system of claim 1, wherein the dispatch control system is configured to transmit, to the mobile unit, real-time variable route planning data for processing by the processor associated with the mobile unit.

3. The dispatch control system of claim 2, wherein the real-time variable route planning data comprises at least one of real-time street level routing data, real-time traffic data, and real-time weather data.

4. The dispatch control system of claim 1, wherein the processor associated with the mobile unit is configured within one of:
an electronic positioning device associated with the mobile unit; or
the mobile unit, wherein the processor is further configured to execute a navigation application; or
a telematics unit of the mobile unit, the telematics unit being operable to autonomously navigate the mobile unit, wherein the mobile unit is an automated vehicle.

5. The dispatch control system of claim 1, wherein a duration of attendance at a given previously attended geographical position is measured by comparing position data from the processor associated with the mobile unit with data indicative of the given geographical position.

6. The dispatch control system of claim 1, wherein the processing system is configured to cause at least one computing device to calculate one or more stochastic characteristics for the durations of attendance based on the records stored in the data store using the steps of:
determining at least one probability distribution type for the durations of attendance based on the records stored in the data store; and
determining one or more parameters for the at least one probability distribution type based on the records stored in the data store.

7. The dispatch control system of claim 1, wherein:
the records of first geographical positions comprise a mobile unit identifier;
the one or more stochastic characteristics comprise one or more stochastic characteristics that are a function of the mobile unit identifier; and
the scheduling process comprises:
determining a set of mobile units for which a probability of a sampled value for the durations of attendance exceeds a predetermined value;
responsive to the said mobile unit being within the set of mobile units, for a given re-ordering of attendance, determining that the given reordering is valid based on one or more constraints, said one or more constraints comprising at least a limit on total travel time for attendance at the plurality of second geographical positions; and
responsive to the said mobile unit not being within the set of mobile units, for a given re-ordering of attendance, determining that the given re-ordering is valid based on said one or more constraints and a probability of failure of attendance at a given geographical position within the given re-ordering.

8. The dispatch control system of claim 1, wherein the one or more stochastic characteristics comprise a mean value of duration and a measure of variation from said mean value; and
wherein the estimated durations of attendance are based on the mean value plus a factor calculated based on the measure of variation.

9. The dispatch control system of claim 1, wherein calculating the plurality of values for the volatility metric in the scheduling process comprises:
re-ordering attendance of said mobile unit such that attendance at one of said second geographical positions associated with a predefined level of duration volatility is ordered after attendance at one of said second geographical positions associated with a predefined limit of duration variability;
wherein said duration volatility and duration variability are based on the calculated one or more stochastic characteristics.

10. The dispatch control system of claim 1, wherein the scheduling process further comprises:
calculating a competency metric for the mobile unit or each mobile unit based on repeat attendance by the mobile unit or each mobile unit at a group of one or more first geographical positions; and
using said competency metric to determine a mobile unit to attend a particular one of said second geographical positions.

11. A computer-implemented method for controlling time variability in a dispatch system, the dispatch system having one or more mobile units and events for said one or more mobile units to attend, an event having a start time, a variable duration and a geographical position, each mobile unit comprising a vehicle, the method comprising:
for data indicative of a sequence of proposed future events, identifying a volatile event within the data that has a start time value before a start time value of a critical event, wherein:
the volatile event has one or more measured stochastic characteristics for a variable duration that matches a predefined stochastic profile;
the predefined stochastic profile is indicative of a probability of a sampled value for the variable duration exceeding an estimated value;
estimated values of duration are used for events within the data indicative of the sequence of proposed future events; and
the critical event has the start time within one or more predefined variability limits;
determining if the start time value of the volatile event is modifiable to a time value that is not before the start time value of the critical event, including:
identifying at least one time period for the volatile event within a time allotted for the sequence of proposed future events that results in a valid sequence of proposed future events, the at least one time period not being before the start time value of the critical event;
responsive to the start time value being modifiable, modifying at least the start time value of the volatile event within the data indicative of the sequence of proposed future events; and
transmitting, to a first mobile unit of the one or more mobile units, data indicative of geographical positions corresponding to said volatile event and said critical event and indicative of said modified start time of the volatile event, the transmitted data for use in generating routing instructions, which, when executed by a processor associated with the first mobile unit, cause navigation of the first mobile unit between physical locations associated with the geographical positions corresponding to said volatile event and said critical event.

12. The method of claim 11, wherein the one or more predefined variability limits for the critical event comprise a maximum allowable delay in the start time for the critical event and identifying the volatile event within the data that has the start time value before the start time value of the critical event comprises:
identifying an event within the data that has a start time value before the start time value of the critical event;
determining a time difference in the sequence of proposed future events based on an estimated duration of the identified event and the start time value of the critical event plus the maximum allowable delay; and
determining whether the identified event is a volatile event based on whether a likelihood of the time difference being less than zero exceeds a predefined threshold, the likelihood of the time difference being based on the one or more measured stochastic characteristics for the identified event.

13. The method of claim 11, wherein modifying at least the start time value of the volatile event comprises:
for the identified at least one time period, determining a volatility metric for the valid sequence of proposed future events, said valid sequence comprising the volatile event having a start time within said time period; and
determining whether the volatility metric is below a predefined threshold, wherein in response to the volatility metric being below the predefined threshold the start time value of the volatile event is modified within the data indicative of the sequence of proposed future events.

14. The method of claim 11, wherein:
the data indicative of the sequence of proposed future events comprises a sequence of proposed future events for each of the plurality of mobile units;
identifying the volatile event within the data comprises identifying the volatile event within a sequence of proposed future events for a first mobile unit;
identifying at least one time period for the volatile event comprises, for the first mobile unit, identifying at least one time period in a sequence of events for a second mobile unit that is not before a start time value of a critical event; and
modifying at least the start time value of the volatile event within the data indicative of the sequence of proposed future events comprises modifying data indicative of a sequence of proposed future events for both the first and second mobile units, such that the second mobile unit attends the event in place of the first mobile unit.

15. A non-transitory computer-readable storage medium for managing time variability in a dispatch system, the dispatch system having one or more mobile units and tasks for said one or more mobile units to attend, a task having a start time, a variable duration and a geographical position, each mobile unit comprising a vehicle, the non-transitory medium comprising a set of computer-readable storage instructions stored thereon which, when executed by at least one processor, cause the at least one processor to:
obtain data indicative of a given task sequence, wherein:
the data indicative of the given task sequence has a variable indicative of a start time and a variable indicative of an end time;
the data indicative of the given task sequence comprises data indicative of a plurality of tasks; and
data indicative of a task in the plurality of tasks comprises a variable indicative of a start time, a variable indicative of a geographical position and a variable indicative of an estimated duration; and
identify pairs of tasks within the data indicative of the given task sequence that comprise data indicative of a volatile task with a start time value before a start time value of a critical task, wherein:
a volatile task is identified based on data indicative of a measured probability distribution for the estimated duration of the volatile task that is calculated from historical data; and
a critical task has a start time within one or more predefined variability limits;
for a given pair of tasks comprising a given volatile task and a given critical task:
identify at least one time period, wherein a start time value of the at least one time period is not before the start time value of the given critical task and the at least one time period has a duration greater than the estimated duration of the given volatile task;
determine whether an assignment that assigns a start time value for the given volatile task within the at least one time period is a valid assignment; and
determine a volatility metric for the assignment;
in response to one or more valid assignments:
select a task pair based on the determined volatility metrics for the pairs of tasks; and
modify the data indicative of the given task sequence to assign a start time value for the volatile task in the task pair to a time value within the at least one time period; and
transmit, to a first mobile unit of the one or more mobile units, data indicative of geographical positions corresponding to said task sequence, the transmitted data for use in generating routing instructions, which, when executed by a processor associated with the first mobile unit, cause navigation of the first mobile unit between physical locations associated with geographical positions of said task sequence corresponding to said volatile event and said critical event.

16. The non-transitory medium of claim 15, wherein the instructions are configured to instruct one or more processors to:
access electronic positioning data for a plurality of mobile units;
calculate data indicative of durations of a plurality of tasks performed in the past based on the electronic positioning data, a duration of a task performed in the past being determined based on a time that electronic positioning data indicates that a mobile unit is in attendance at a geographical position associated with said task; and
calculate one or more stochastic characteristics based on the data indicative of durations of a plurality of tasks performed in the past;
wherein said one or more stochastic characteristics are used to calculate a value for the variable indicative of an estimated duration of a task and to provide the data indicative of a measured probability distribution for the estimated duration of the volatile task.

17. The non-transitory medium of claim 15, wherein the volatility metric is determined based on measured probability distributions for the tasks present in the sequence of tasks associated with the valid assignment.

18. A non-transitory computer-readable storage medium comprising a set of computer-readable instructions stored thereon which, when executed by at least one processor, cause the at least one processor to:
    receive from a dispatch system data indicative of a sequence of geographical positions, wherein:
        the sequence of geographical positions corresponds to an order of attendance for a mobile unit at one or more tasks, each task having a start time, a duration of attendance and a geographical position, the mobile unit comprising a vehicle;
        the received data depends on one or more stochastic characteristics for the durations of attendance, the one or more stochastic characteristics representative of a variability of the durations of attendance at geographical positions previously attended by the mobile unit or by other mobile units associated with the dispatch system; and
        the received data depends on a volatility metric, each value of the volatility metric being associated with a valid re-ordering of attendance of the mobile unit at one or more geographical positions in the sequence of second geographical positions; and
    generate navigation instructions, said navigation instructions relating to physical locations associated with the sequence of geographical positions.

19. The non-transitory medium of claim 18, wherein the at least one processor is configured to:
    receive, from the dispatch system, real-time variable route-planning data; and
    modify the navigation instructions based on processing said real-time variable route-planning data.

20. The non-transitory medium of claim 18, wherein the real-time variable route planning data comprises at least one of real-time street level routing data, real-time traffic data, and real-time weather data.

21. The non-transitory medium of claim 18, wherein the at least one processor is configured within one of:
    an electronic positioning device associated with the mobile unit; or
    the mobile unit, wherein the at least one processor is further configured to execute a navigation application; or
    a telematics unit of the mobile unit, the telematics unit being operable to autonomously perform the navigation of the mobile unit between physical locations associated with the geographical positions, wherein the mobile unit is an automated vehicle.

* * * * *